United States Patent [19]
Hair

[11] 3,800,221
[45] Mar. 26, 1974

[54] DIGITAL FREQUENCY METER
[75] Inventor: Hugh A. Hair, Liverpool, N.Y.
[73] Assignee: Anaren Microwave, Incorporated, Syracuse, N.Y.
[22] Filed: May 26, 1972
[21] Appl. No.: 257,206

[52] U.S. Cl............................................ 324/78 D
[51] Int. Cl............................................ G01r 23/02
[58] Field of Search .......... 324/82, 78 D, 79 D, 84, 324/77 G, 77 H; 328/140

[56] References Cited
UNITED STATES PATENTS
3,395,346  7/1968  Kincheloe et al................ 324/82 X Primary Examiner—Alfred E. Smith

[57] ABSTRACT

A correlator means having two inputs, receives at one input the signal whose frequency is to be measured (the unknown signal) and at the other input the unknown signal delayed by a delay means of predetermined electrical length. The correlator means has two outputs which transmit, respectively, signals representing $\sin\theta$ and $\cos\theta$, where $\theta$ is the differential phase between the signals received at the two inputs and is a function of the electrical length and the frequency. The outputs of the correlator are connected to digitizing means which generate binary signals in accordance with the arithmetic signs of $\sin\theta$ and $\cos\theta$. There is also disclosed the parallel arraying of delay means – correlator means combinations to increase the resolution of the meter.

10 Claims, 8 Drawing Figures

DIGITAL FREQUENCY MONITOR

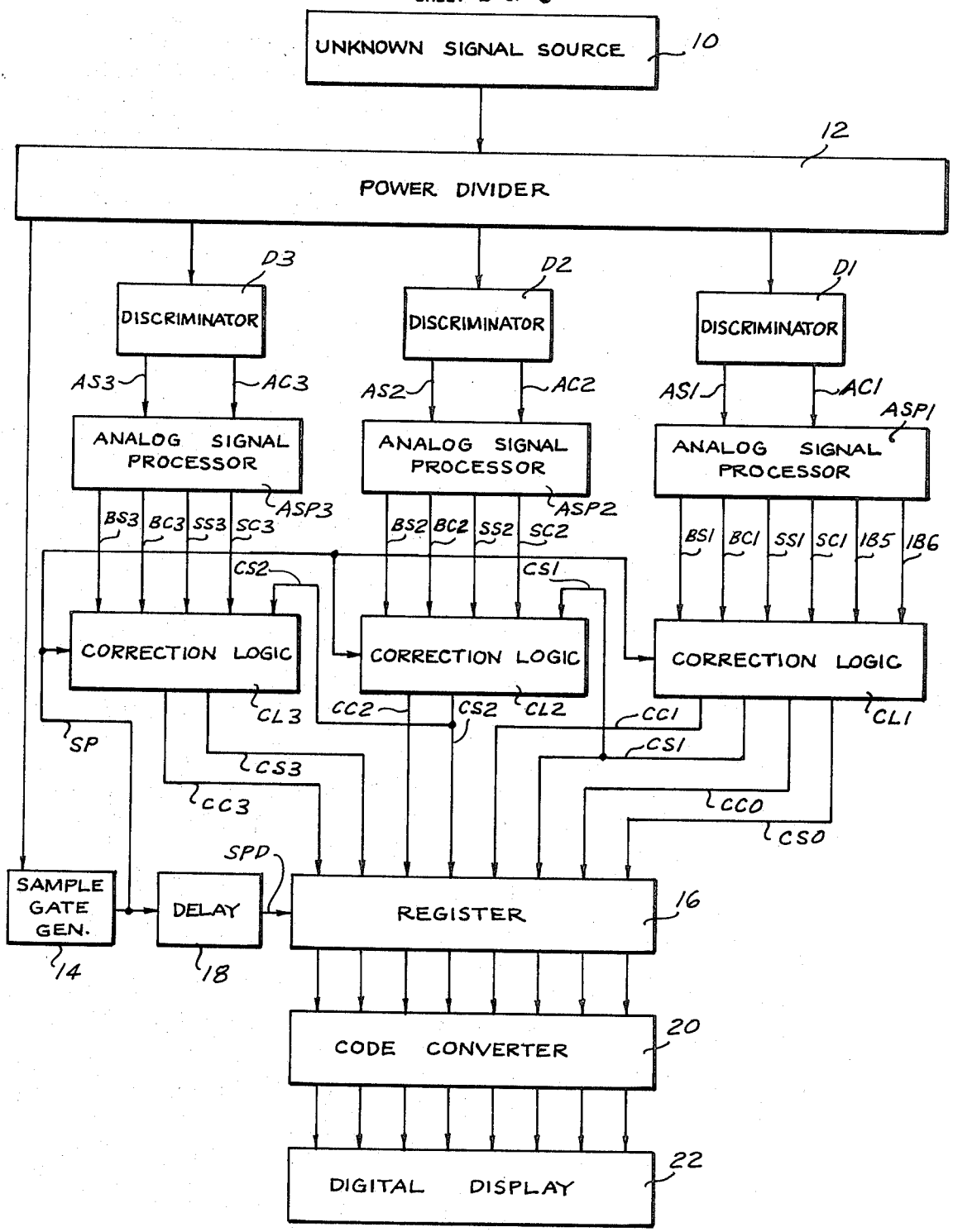
FIG. 1    DIGITAL FREQUENCY MONITOR

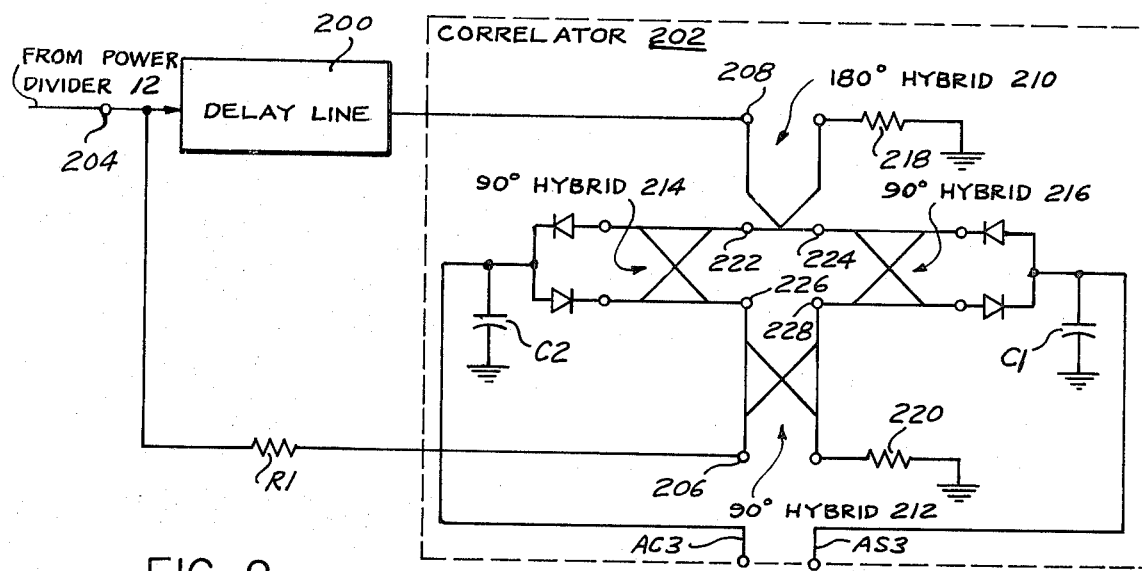
FIG. 2   DISCRIMINATOR D3
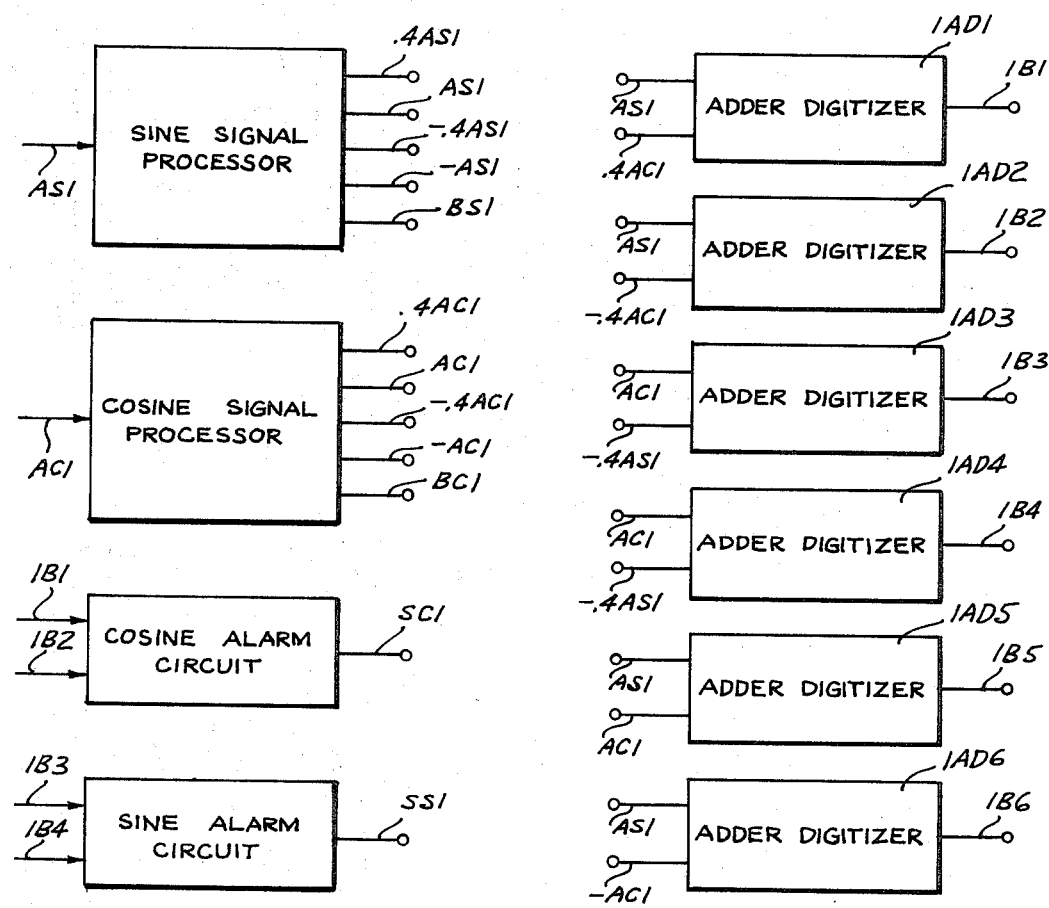
FIG. 4   ANALOG SIGNAL PROCESSOR ASP1

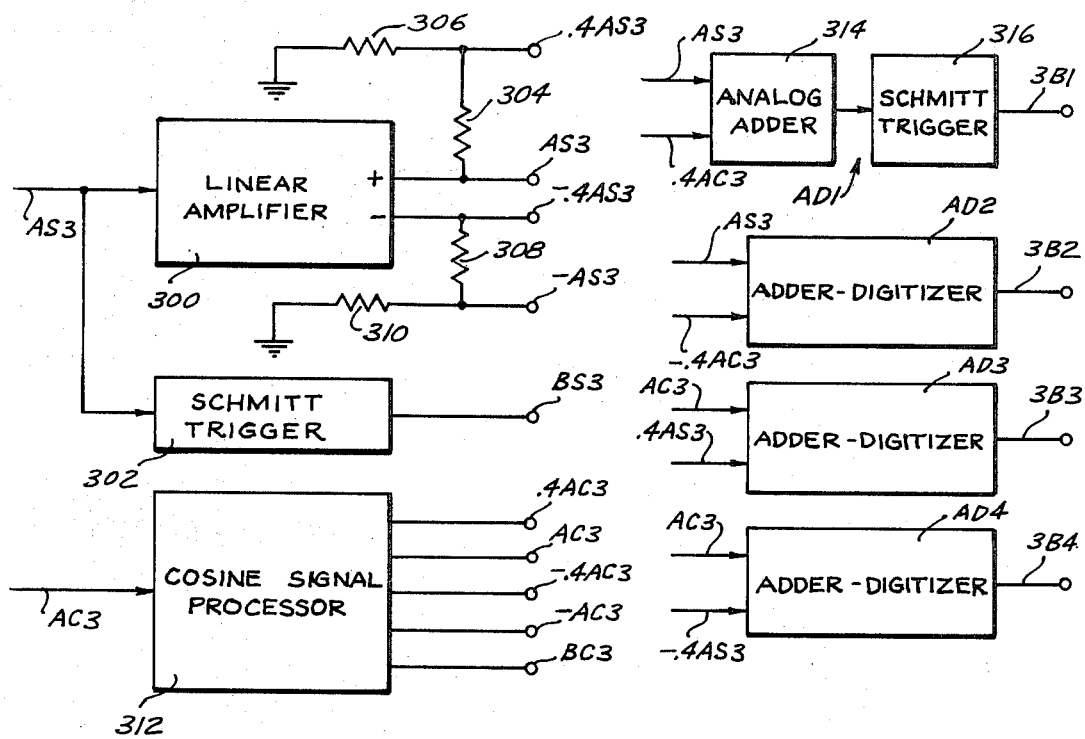
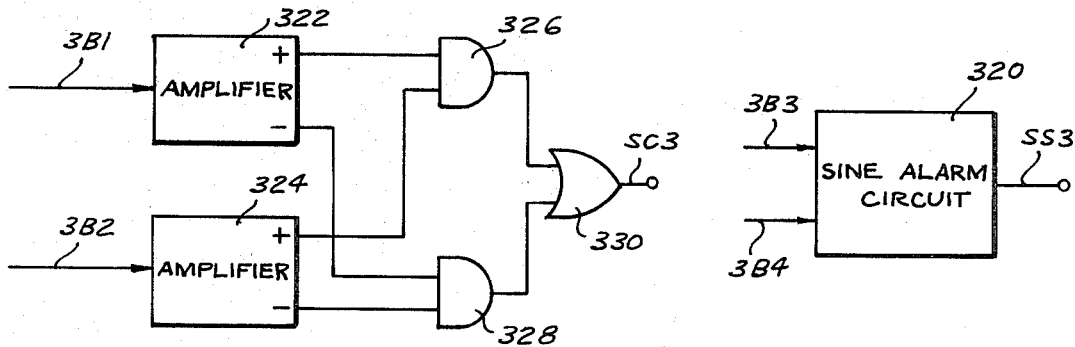
FIG. 3 ANALOG SIGNAL PROCESSOR ASP3

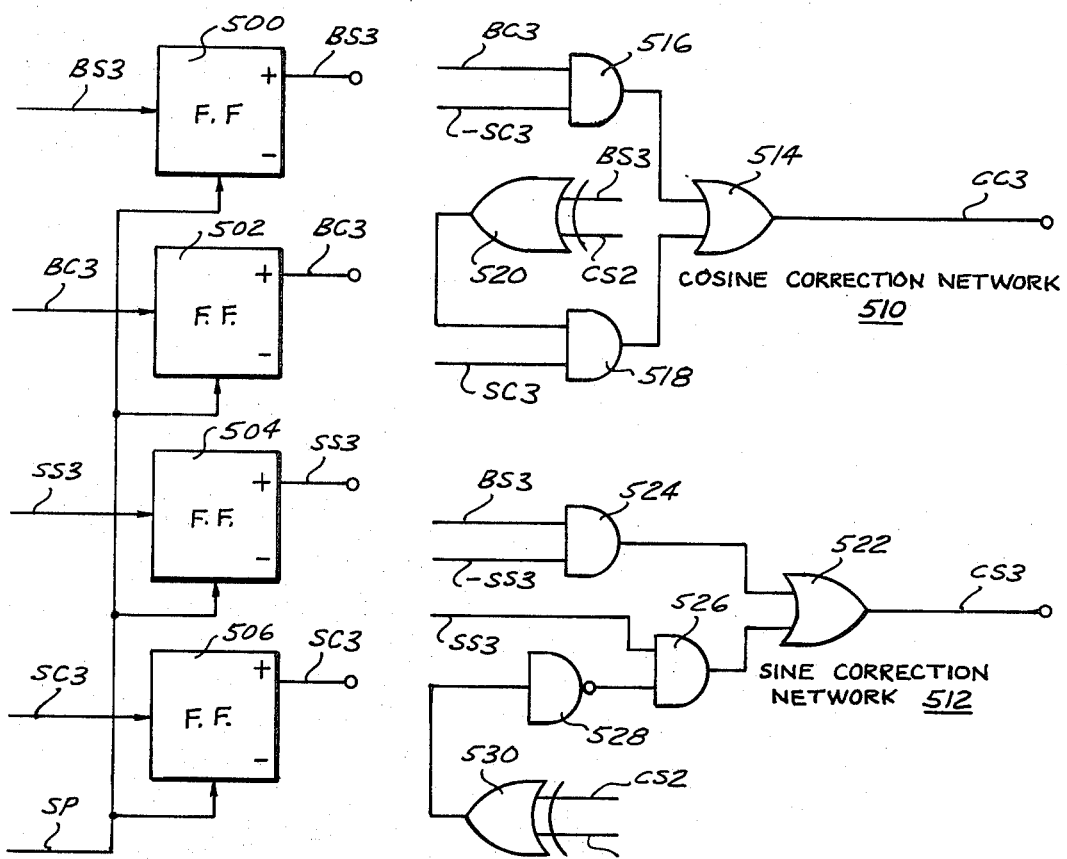
FIG. 5    CORRECTION LOGIC CL3
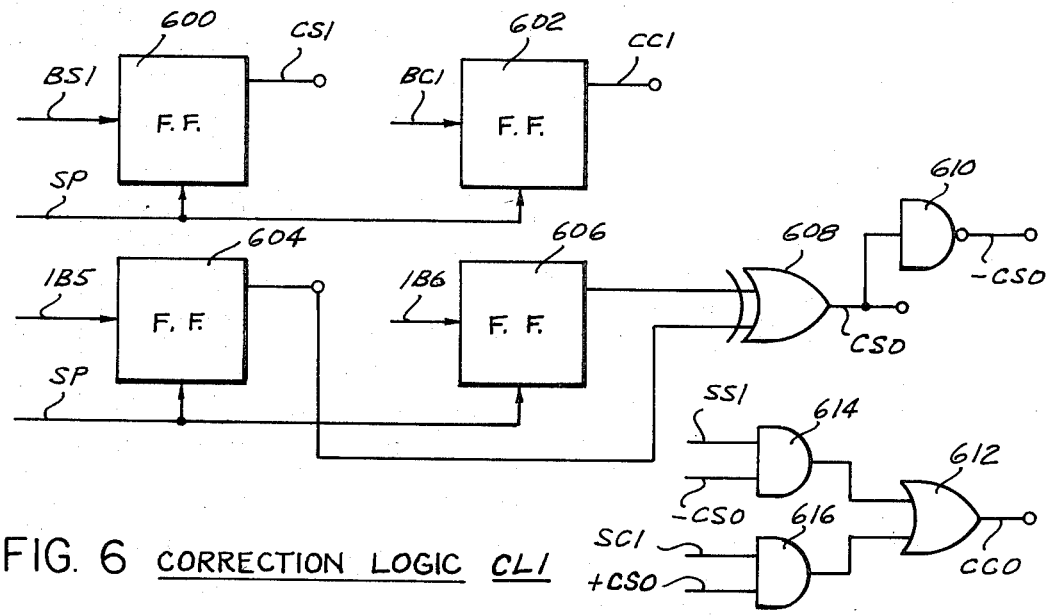
FIG. 6    CORRECTION LOGIC CL1

SAMPLE GATE GENERATOR 14

DIGITAL FREQUENCY METER

This invention pertains to measuring devices and more particularly to frequency meters giving digital indications.

Frequency monitors or meters have many uses such as in calibrating and tuning equipment as well as in measuring the frequencies used in radar systems for surveillance and the like. Heretofore, most meters used calibrated variable tuned circuits or pulse counting techniques. The analog techniques using calibrated tuned circuits and the like had limited resolution while the pulse counting techniques required ultra fast digital counting devices and the like. Both techniques generally required expensive and very complex components.

It is a general object of the invention to provide improved measuring devices to monitor the frequency or phase of unknown signals.

It is another object of the invention to provide such devices which have finer resolutions than previously available devices and which are much smaller, lighter in weight and less expensive than previously available devices.

It is a further object of the invention to provide such device which exploit interferometric techniques on microwave signals to satisfy the above objects.

Briefly, the invention contemplates apparatus for indicating the frequency of an unknown signal which comprises a correlator means having first and second inputs. The first input receives the unknown signal directly while the second input receives the unknown signal via a delay line of predetermined electrical length whereby the signals received at the inputs differ in phase by an amount related to the electrical length of the delay means and the frequency of the unknown signal. The correlator means transmits from two outputs signals representing $\sin \theta$ and $\cos \theta$, where $\theta$ is the differential phase between the two signals received at the inputs. Means digitize the signals at these two outputs to generate binary signals in accordance with the arithmetic signs of $\sin \theta$ and $\cos \theta$.

It should be noted, that the differential phase between two signals having the same frequency can also be digitally monitored merely by deleting the delay means and transmitting each signal directly to one of the inputs of the correlator means. The invention also contemplates such a digital phase meter.

Other objcts, features and advantages of the invention will be apparent from the following detailed description when read with the accompanying drawings which show by way of example and not limitation, apparatus for practicing the invention.

In the drawings:

FIG. 1 is a block diagram of a digital frequency monitor utilizing the invention;

FIG. 2 is a schematic diagram of a typical discriminator incorporated in the digital frequency monitor of FIG. 1;

FIG. 3 is a block diagram of a typical more-significant analog signal processor of the digital frequency monitor of FIG. 1;

FIG. 4 is a block diagram of the least-significant analog signal processor of the digital frequency monitor of FIG. 1;

FIG. 5 is a block diagram of one of the more-significant correction logic circuits of FIG. 1;

FIG. 6 is a block diagram of the least-significant correction logic circuits of FIG. 1;

Figure 7:
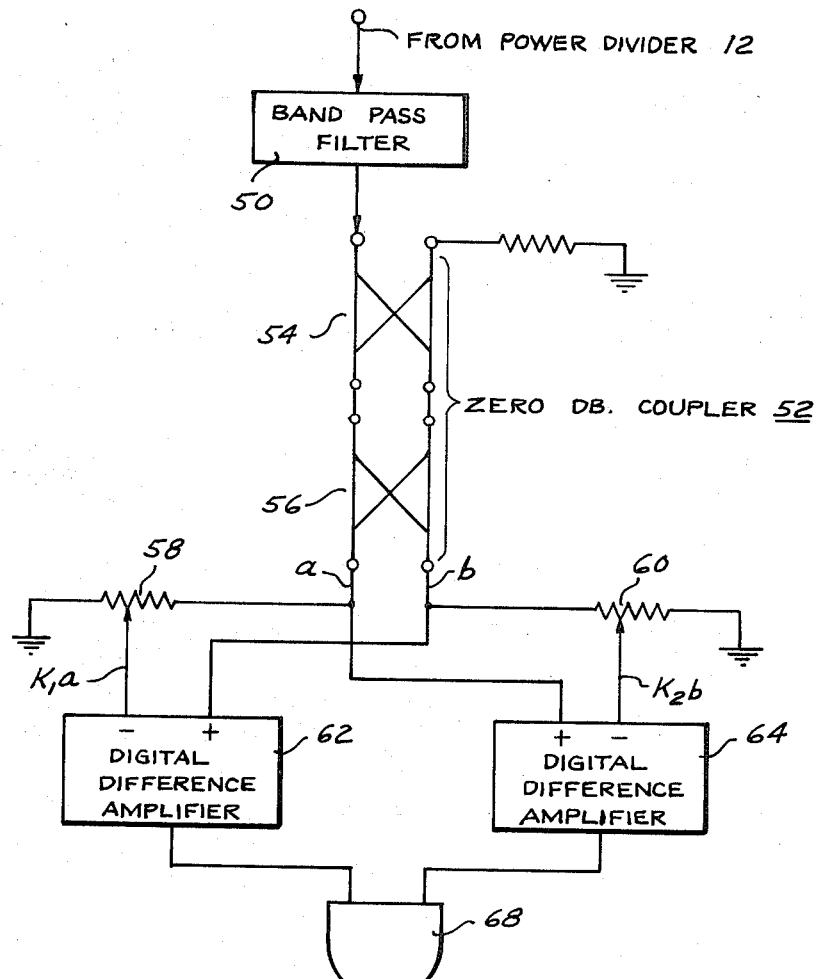
FIG. 7 is a block diagram of the sample gate generator of FIG. 1.

Before describing the digital frequency monitor according to the invention, a brief discussion of the theory behind the invention will be given.

It is known that when a signal having a given frequency passes through a delay line of a given length it is shifted in phase by a calcuable angle. Therefore, if a signal of an unknown frequency passes through a delay line of known electrical length and the phase shift is measured, the frequency can be calculated. In fact, the frequency of the unknown signal is linearly proportional to the phase shift. One simple way of measuring the phase shift is to feed the "unknown" signal directly into one input of a phase comparator and to feed the "unknown" signal via a delay line of known electrical length to the other input of the phase comparator. The output signal from the phase comparator will represent the phase difference between the two signals received at its inputs. Since the length of the delay line is known, the output signal also represents the frequency of the unknown signal.

While many phase comparators are available, there is one which is ideally suited for use in the invention. This device called a correlator and hereinafter more fully described, measures phase differences in the following way assuming the two signals whose phases are to be compared have the same amplitude V and the same frequency. The two signals are phase shifted, combined and square law detected in a particular way to yield two signals $V^2 \sin \theta$ and $V^2 \cos \theta$, where $\theta$ is the phase shift. Now, if one ignores the amplitudes of the signals and merely is concerned with the sign or polarity of the signals, four binary combinations ++, +−, −+, and −− (sine polarity, cosine polarity in that order) are possible which represent the four following ranges of phase difference, respectively, 0° to 90°, 90° to 180°, 180° to 270° and 270° to 360°. For the sake of clarity, assume the length L of the delay line is chosen so that the range of phase shift between 0° and 360° covers the frequency range between 2GHz and 4GHz. Then, the sign or polarity combination ++ represents a signal having a frequency in the range 2GHz to 2.5GHz, the combination +− represents 2.5GHz to 3GHz, etc. Stated differently, the sign combination ++ represents a signal having the frequency 2.25±.25GHz, the combination +− represents 2.75±.25GHz, etc. Thus, if one assumes that a + sign is equivalent to a binary 1 and a − sign is equivalent to a binary 0, then if one monitors the signs or polarities of the signals at the output of the correlator one obtains a digital indication of the frequency of the unknown signal. For the example being considered, the frequency of the unknown signal is indicated as 2.25GHz, 2.75GHz, 3.25GHz or 3.75GHz with an uncertainty of ±.25GHz.

While in some applications such measurements are tolerable, one usually requires more precise indications. Such indications can be accomplished when the following is considered, still assuming the delay line of length L covers the frequency range between 2GHz and 4GHz in one 360° cycle of phase shift.

Assume the unknown signal is fed in the same way as before to another delay line-correlator combination hereinafter called a discriminator, wherein the delay line has an electrical length equal to 4L, i.e., the delay line is four times longer. Thus, this second discriminator provides four times the phase difference for the same input frequency and has four times the resolution of the first discriminator. In particular, the 0° to 360° phase difference range now covers a 0 to .5GHz frequency range. In other words, the second discriminator divides each of the four equal first ranges indicated by the first discriminator into four equal smaller ranges, each one-quarter of the size of the first ranges.

Now, if both discriminators operate in parallel, sixteen unique four-bit binary combinations are obtainable with each combination representing one of sixteen unique ranges, each 125MHz wide, in the monitoring range of 2GHz to 4GHz.

This "gas meter" type system can be expanded to three or more parallel discriminators wherein the length of the delay line of each subsequent discriminator is four times the length of the delay line of the previous discriminator. As each such discriminator is added the resolution is increased fourfold.

It will be recalled that each discriminator divides a range into four equal ranges, each represented by a quadrant. However, errors can occur at the quadrant boundaries. These errors can arise from either the simple signal-to-noise ratio whenever a sine or cosine value approaches zero or because of non-linearity of the discriminator which is typically 10°. Thus, whenever a discriminator indicates a phase angle, say within about 22.5° of the quadrant boundaries 0°, 90°, 180° and 270°, at least one of its binary outputs must be regarded as suspect. The unreliable binary output is ignored and a substitute binary output used. The value of the substitute binary output is summarized hereinafter and is obtained from an analysis of the sine and cosine polarities in different ranges.

In the following description a signal will be designated by a reference character. This same reference character will be used for an output which transmits the signal, the line which carries the signal, and the input which receives the signal. In this way, it is easier to follow the signal flow.

Refer now to FIG. 1 which shows a block diagram of the digital frequency monitor according to the invention wherein, by way of example, an unknown signal frequency within the range of 2GHz to 4GHz is digitally represented to an eight-bit accuracy.

A signal whose frequency is to be measured is fed from source 10, via power divider 12, to discriminators D1, D2 and D3, and sample gate generator 14. Power divider 12 is basically a fan-out network which permits the unknown signal to be fed in parallel to the sample gate generator and the discriminators. It can include amplifiers and/or attenuators to feed controlled amounts of signals from its outputs. Gate generator 14 whose function and construction is hereinafter more fully described, generates sampling pulses to control a registering and display when the unknown frequency is within the monitoring range.

Each of the discriminators D1 to D3 includes a two input correlator and a delay line, as described above and whose details will be described below. The discriminators are identical except for the lengths of the delay lines. If the delay line in discriminator D3 has a length L then those in discriminators D2 and D1 have lengths 4L and 16L, respectively.

A typical discriminator D3 receives the unknown signal at its input and transmits a signal proportional to sin $\theta$ from its output AS3 and proportional to cos $\theta$ from its output AC3, where $\theta$ is the differential phase shift introduced by the delay line to analog signal processor ASP3. Similarly, discriminators D2 and D1 transmit, via their outputs AS2 and AC2 and AS1 and AC1, respectively, analog sine and cosine signals to analog signal processors ASP2 and ASP1, respectively.

Typical analog signal processor ASP3, hereinafter more fully described, includes circuits for generating several specialized signals. The signals from outputs BS3 and BC3 are binary high (1) and low (0) signals representing the polarity (+) or (−) of the analog sine and cosine signals on lines AS3 and AC3, respectively, without regard to their amplitudes. Such signals can be generated by many devices such as Schmitt triggers or limiting amplifiers.

The analog signal processor ASP3 also includes: circuitry for generating a binary signal on output SS3 when the phase angle is within a 45° region centered at 0° or within a 45° region centered at 180°, i.e., the phase angle is near a quadrant boundary where sine indications are not reliable; and circuitry for generating a binary signal on output SC3 when the phase angle is within a 45° region centered at 90° or within a 45° region centered at 180°, i.e., when the phase angle is near a quadrant boundary when the cosine indications are unreliable. The outputs BS3, BC3, SS3 and SC3 of analog signal processor ASP3 are fed to correction logic CL3. Similarly, the outputs BS2, BC2, SS2 and SC2 of analog signal processor ASP2 are fed to correction logic CL2; and the outputs BS1, BC1, SS1 and SC1 are fed to correction logic CL1 along with two further signals 1B5 and 1B6. In addition, the output CS2 of correction logic CL2 is fed to correction logic CL3 and the output CS1 of correction logic CL1 is fed to correction logic CL2.

The correction logic SL3 as hereinafter described, basically modifies the most-significant sine and cosine bits represented by the signals on lines BS3 and BC3 if required by alarm signals on lines SS3 and SC3. For example, if the SS3 signal is present then the sine bit is unreliable. Therefore, the sine bit represented by the BS3 signal is discarded and instead a bit is generated by comparing the cosine bit BC3 and the corrected next less-significant sine bit CS2. Similarly, if the SC3 signal is present then the cosine bit is unreliable. Therefore, the cosine bit represented by the BC3 signal is discarded and instead a bit is generated by comparing the sine bit BS3 and the corrected next less-significant sine bit CS2. Correction logic CL3 then transmits correct sine and cosine bits on lines CS3 and CC3. Correction logic CL2 is similar to correction logic CL3 except that it processes the next less-significant sine and cosine bits. It should be noted that in this way the errors are forced back to the least significant stage.

Correction logic CL1 is hereinafter described generates four bits instead of two. It generates a sine bit CS1 and a cosine bit CC1 which are functions only of signals BS1 and BC2, respectively. It also generates a CS0 bit which is a function of the parity of the signals 1B5 and 1B6. It further generates a CC0 bit which is equal to the binary value of either the SS1 or SC1 signals, the choise being dependent upon the value of the CS0 signal.

In effect, the correction logic circuits transmit as a group an eight-bit number in parallel. Correction logic circuits CL3 and CL2 divide the frequency into the sixteen ranges and correction logic circuit SL1 further divides each of the sixteen ranges defined by correction logic circuits CL2 and CL3 into sixteen sub-ranges.

The corrected binary values or bits from the correction logics CL3, CL2 and CL1 are fed via lines CC3, CS3, CC2, CS2, CC1, CS1, CC0 and CS0 to inputs of register 16 which can be a conventional eight-bit flip-flop register with input gating control. Thus, when a pulse is received from delay 18 via line SPD at the gating control an eight-bit binary number is stored in register 16. The binary number is not a pure binary number of the conventional binary number system but resembles a Gray-coded binary number. However, each such binary number represents a unique frequency range which is one $2^{-8}$th (one-two hundred fifth sixth) of the measurable bandwidth. In order to display this number by off-the-shelf display devices there is required a code conversion to pure binary or to binary-coded representation. This is accomplished by code converter 20 which can be a conventional matrix converter or a conventional read-only memory. The output of code converter 20 is fed to digital display 22 which comprises conventional display devices such as Nixie-tubes, light emitting diodes or the like.

In FIG. 2 there is shown a typical discriminator D3 which receives a portion of the power of the unknown signal from power divider 12 and transmits from its outputs AC3 and AS3 analog signals which are proportional to the cosine and sine, respectively, of a differential phase angle related to the frequency of the unknown signal. The discriminator D3 comprises the delay 200 of previously mentioned electrical length L and correlator 202. The input terminal 204 of discriminator D3 is connected directly to one input terminal 206 of correlator 202 and via delay line 200 to the second input terminal of correlator 202. In order to equalize the amplitudes of the input signals to the correlator attenuation represented by the resistor R1 is included in the connection between terminals 204 and 206 to compensate for the attenuation introduced by delay line 200. Thus, the terminals 206 and 208 receive equiamplitude signals of the same frequency but because of the delay introduced by delay line 200, have a differential phase angle. This phase angle is measured by correlator 202.

Correlator 202 comprises 180° hybrid 210 and three 90° hybrids 212, 214 and 216. One input port of 180° hybrid 210 is connected to terminal 208 to receive the delayed unknown signal while the other input port thereof is terminated with characteristic impedance 218. Similarly, one input port of 90° hybrid 212 is connected to terminal 206 to receive the undelayed unknown signal while the other input port thereof is terminated by characteristic impedance 220. One output port of 180° hybrid 210 is connected via junction 222 to one input port of 90° hybrid 214, while the other output port of 180° hybrid 210 is connected via junction 224 to one input port of 90° hybrid 216. Similarly, one output port of 90° hybrid 212 is connected via junction 226 to the other input port of 90° hybrid 214 while the other output port of 90° hybrid 212 is connected via junction 228 to the other input port of 90° hybrid 216. The output ports of 90° hybrid 216 are connected in parallel via oppositely polarized diodes to the ungrounded terminal of filter capacitor C1 which is connected to output terminal AS3. The diodes and the capacitor act as a full-wave rectifier. Similarly, the output ports of 90° hybrid 214 are connected in parallel via oppositely polarized diodes to the ungrounded terminal of filter capacitor C2 which is connected to output terminal AC3. Again, the diodes and capacitor C2 act as a full-wave rectifier.

When a signal V is received at terminal 208 and a signal V is received at terminal 206, a signal $V^2\cos\theta$ is transmitted from terminal AC3 and a signal $V^2\sin\theta$ is transmitted from terminal AS3, where $\theta$ is the angular phase difference between the signals received at terminals 206 and 208.

Discriminators D2 and D1 are identical to discriminator D3 except that their delay lines have electrical lengths 4L and 16L, respectively.

The analog signal processor ASP3 shown in FIG. 3 converts the analog values of the sine and cosine voltages from discriminator D3 to pure binary or digital values representing only the sign or polarity of these voltages. For example, if the signal on output AS3, representing $\sin\theta$ is positive, the processor converts this signal to a digital signal representing binary one, and if negative to a signal representing binary zero, and similarly for $\cos\theta$ represented by the signal on line AC3. In addition, the processor generates digital alarm signals to indicate when the phase angle is close to a quadrant boundary so as to alert the apparatus to perform a correction routine. It can be shown that when $(\sin\theta)+(.4\cos\theta)$ and $(\sin\theta)-(.4\cos\theta)$ have the same polarity the phase angle $\theta$ is within the unreliable range about the 90° or 270° quadrant boundaries where a cosine is suspect; and when $(\cos\theta)+(.4\sin\theta)$ and $(\cos\theta)-(.4\sin\theta)$ have the same polarity the phase angle $\theta$ is within the unreliable range about the 0° and 180° quadrant boundaries where a sine signal is suspect. The processor mechanizes tests to generate a binary alarm signal SC3 to indicate when a cosine value is unreliable and to generate a binary alarm signal SS3 when a sine value is unreliable.

The processor ASP3 can perform these signal manipulations in many ways. However, for the sake of definiteness, a straightforward mechanization will be discussed. A sine signal processor comprising a linear amplifier 300 and a Schmitt trigger 302 receives the analog signal AS3 representing $\sin\theta$ from discriminator D3. The Schmitt trigger 302 which is biased to trigger on for positive voltages and off for negative voltages transmits a digital signal from its output BS3. Thus, when $\sin\theta$ is positive, output BS3 transmits a signal representing binary one and when $\sin\theta$ is negative, output BS3 transmits a signal representing binary zero.

When linear amplifier 300 which is a paraphase amplifier receives a signal AS3 it transmits the signal amplified from output AS3, and the signal amplified and inverted from output −AS3. Output AS3 is connected via a potentiometer comprising resistors 304 and 306 to ground. The tap of the potentiometer is connected to output .4AS3. The location of the tap is so chosen that the signal on output .4AS3 is 40 percent of the signal output AS3. Similarly, output −AS3 is connected via resistors 308 and 310 to ground with the junction connected to output −.4AS3.

Cosine signal processor 312 is the same as the above described sine signal processor except that it receives the signal representing cosine $\theta$ on line AC3 from discriminator D3 and generates corresponding signals .4AC3, AC3, −.4AC3, −AC3 and BC3 which have the same significances for cosine values as the signals generated by the sine signal processor have for sine values.

The next array of circuits comprises four identical adder-digitizers AD1 to AD4 which basically, analog add two analog signals from the sine and cosine signal processors and convert the sign or polarity of the resulting sum to a binary signal. If the sum is positive the resulting binary signal represents a binary one, if the sum is negative, then binary zero. A typical adder-digitizer AD1 comprises an analog adder 314 for adding the signals AS3 and .4AC3 at its inputs to give a sum signal at its output which is connected to the input of Schmitt trigger 316. Schmitt trigger 316 which is similar to Schmitt trigger 302 then gives a digital signal at its output 3B1 having one of the two binary values depending on the polarity of the sum signal. Thus, adder-digitizer AD1 gives a digital signal 3B1 whose binary value is determined by the polarity of analog sum of the signals AS3+.4AC3. In the same way, the signals 3B2 to 3B4 are generated by the adder-digitizer AD2 to AD4, respectively, in response to the summations: AS3+(−.4AC3);AC3+.4A3; and AC3+(−.4AS3), respectively.

The remainder of the analog signal processor ASP3 is directed to giving alarm signals when the sine and cosine values are unreliable because the phase angle is near a quadrant boundary. Cosine alarm circuit 318 gives the cosine alarm signal SC3. This is accomplished by sensing for the fact that the binary signal 3B1 is equal to the binary signal 3B2. Now it will be recalled that binary signal 3B1 is generated by adder-digitizer AD1 which digitized the sign of the addition of signal AS3 to signal .4AC3 when these signals actually represented the value of sin $\theta$ and .4 cos $\theta$, or, in other words, signal 3B1 represents the sign of the calculation(sin$\theta$)+(.4 cos $\theta$). Similarly, signal 3B2 represents the sign of the calculation(sin$\theta$)−(.4 cos $\theta$). It will also be recalled that whenever, the signs or polarities of these two calculations are equal, the binary representation of the sign of cos $\theta$ is unreliable. The mechanization of cosine alarm circuit 318 can take many forms but for the sake of definiteness it is shown as comprising paraphase amplifiers 322 and 324 receiving, respectively, the 3B1 and 3B2 signals to generate, respectively the 3B1 and −3B1, and 3B2 and −3B2 signals. These signals are fed to a logic network comprising AND-gates 326 and 328 and OR-circuit 330 whose output is connected to line SC3. The logic network satisfies the following Boolean equation:

$$(3B1 \cdot 3B2)+(3B1' \cdot 3B2')=SC3$$

In other words, a signal representing a binary one is present on line SC3 only when the binary values represented by the signals on lines 3B1 and 3B2 are equal to indicate the sign of the cos $\theta$ is unreliable.

The sine alarm circuit 320 is identical and performs the following Boolean operation: (3B3 · 3B4)+(3B3' · 3B4')=SS3 so a signal representing a binary one on line SS3 indicates the sign of sin $\theta$ is unreliable.

It should be noted that circuits 318 and 320 can be replaced by EXCLUSIVE-OR circuits whose outputs are then inverted.

Analog signal processor ASP2 is the same except it processes signals AS2 and AC2 from discriminator D2 to generate signals BS2, BC2, SC2 and SS2.

Analog signal processor ASP1 associated with the least significant bits is shown in FIG. 4. The signal processor ASP1 is the same in all respects with analog signal processor ASP3 except it processes signals AS1 and AC1 from discriminator D1 to generate signals BS1, BC1, SC1 and SS1. It also includes two further adder-digitizers 1AD5 and 1AD6. Adder-digitizer 1AD5 gives a binary signal indicating the sign of the result of the analog addition AS1+AC1, and adder-digitizer 1AD6 gives a binary signal indicating the sign of the result of the analog addition of signals AS1 and −AC1.

In FIG. 5 the most significant bits correction logic CL3 is shown comprising: a register defined by the array of flip-flops 500, 502, 504, 506 and 508 which receive signals BS3, BC3, SS3, SC3 and BS2, respectively, from the analog signal processors to generate each signal and its complement; a cosine logic network 510 which transmits the correct cosine bit on line CC3 to register 16; and a sine logic network 512 which transmits the correct sine bit on line CS3 to register 16.

The flip-flops are force set to a state in accordance with the binary values represented by their respective input signals only during the presence of a read or sampling pulse of line SP which alerts each flip-flop to accept a binary signal for storage.

Included in correction logic CL3 is a cosine logic correction network 510 comprising OR-circuit 514 whose output is connected to line CC3 and having a first input connected to the output of AND-circuit 516 whose inputs are connected to lines BC3 and −SC3 and having a second input connected to the output of AND-circuit 518 whose inputs are connected to line SC3 and the output of EXCLUSIVE-OR-circuit 520. The inputs of EXCLUSIVE-OR-circuit 520 are lines BS3 and CS2. In operation cosine correction network 510 passes the cosine bit represented by the signal on line BC3 to line CC3 if there is no alarm, i.e., no signal on line SC3, to indicate the cosine bit is unreliable. If there is a signal on line SC3 indicating the bit is unreliable AND-circuit 516 is blocked and AND-circuit 518 opened. Therefore, the cosine bit becomes dependent on the parity of the sine bit of that level represented by the BS3 signal and the sine bit of the next lower level represented by the CS2 signal.

Sine correction network 512 comprises OR-circuit 522 whose output is connected to line CS3, and which has a first input connected to the output of AND-circuit 524 whose inputs receive the BS3 and −SS3 signals and a second input connected to the output of AND-circuit 526. The first input of AND-circuit 526 is connected to line SS3 and the second input via AND-circuit 528, acting merely as an inverter, to the output of EXCLUSIVE-OR-circuit 530 which receives the CS2 and BC3 signals. In operation, sine correction network 512 passes the BS3 bit to line CS3 if there is no alarm signal SS3 to indicate the sine bit is unreliable. If there is a signal on line SS3 (and therefore no signal on line −SS3) indicating the sine bit is unreliable AND-gate 524 is blocked and AND-gate 526 is opened. Therefore, the sine bit becomes dependent on the parity of the cosine bit of that level represented by the BC3 and sine bit of the next lower level represented by the CS2 signal.

Correction logic CL2 is similar to corection logic CL3 except for the obvious substitution of the signals being processed and generated and thus will not be described.

However, correction logic CL1 is completely different and is shown in FIG. 6. Correction logic CL1 generates the four least-significant bits of the binary number. The two more-significant of these bits represented by the CS1 and CC1 signals are generated by flip-flops 600 and 602, which respectively receive the BS1 and BC1 signals, when the sample pulse on line SP strobes these flip-flops. The third of these bits represented by the CS0 signal is generated by EXCLUSIVE-OR-circuit 608 whose inputs are connected to the outputs of flip-flops 604 and 606. These flip-flops store the binary values on lines 1B5 and 1B6 from analog signal processor ASP1 when strobed by the pulse on line SP. It should be recalled that the signal on line 1B5 represents the polarity of the sum values of $\sin \theta$ and $\cos \theta$ generated by discriminator D1 (FIG. 1) and the signal on line 1B6 represents the polarity of the sum of values of $\sin \theta$ and $-\cos \theta$. The value of the parity of the signals on lines 1B5 and 1B6 determines the third bit. The fourth and least-significant bit is transmitted on line CC0 by OR-circuit 612 whose inputs are connected to the outputs on AND-circuits 614 and 616. AND-circuit 614 receives the SS1 (sine alarm) signal from analog signal processor ASP1 and the $-$CS0 signal from AND-gate 610 which merely inverts the CS0 signal. AND-circuit 616 receives the SC1 (cosine alarm) signal from processor ASP1 and the CS0 signal from EXCLUSIVE-OR-circuit 608. The least-significant bit on line CC0 is determined by the value of one of the alarm signals. Which of the alarm signals to be used is determined by the binary value of the CS0 bit.

Figure 8:
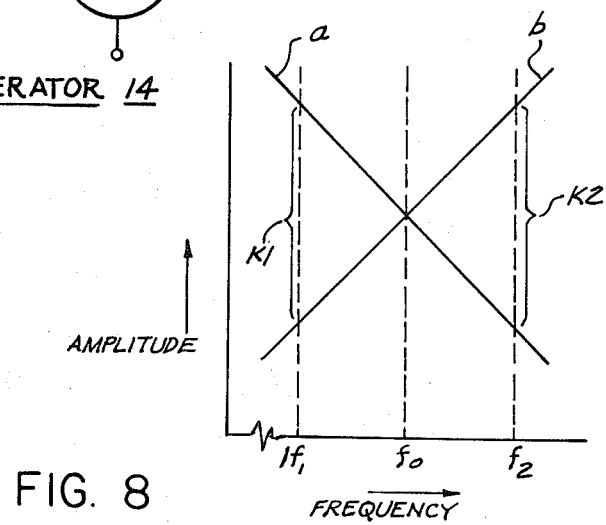
FIG. 8 is a plot of amplitude as a function of frequency of a zero db. coupler operating as filter in the sample gate generator of FIG. 7.

The sample gate generator 14 shown in FIG. 7 receives unknown signals from power divider 12 and passes those unknown signals having frequencies within the range of interest, say from 2 to 4GHz via band-pass filter 50 to the input of 0 db. coupler 52. Coupler 52 comprises two 3 db. couplers 54 and 56 connected in tandem. If the 3 db. couplers have an operating frequency about four to five times the upper end of the frequency range under consideration, coupler 52 operates as a filter having the frequency response shown in FIG. 8. The output of a coupler 52 transmits over a definite frequency range a signal following a linear response characteristic having a negative slope while the output b of coupler 52 transmits over the same definite frequency range a signal following a linear response characteristic having a positive slope. The characteristics intersect at the center frequency of frequency range under consideration and have the same amplitude value. Now, by studying FIG. 8 one can start to devise the requirements for a pulse generator. First there is selected the minimum frequency $f_1$ then it can be seen that the unknown signal has a frequency greater than $f_1$ as long as output b is greater than $K_1$ time output a, where $K_1$ equals a fraction.

Similarly, pick the upper frequency $f_2$ then it can be seen that the unknown signal has a frequency less than frequency $f_2$ as long as output a is greater than $K_2$ times output b. Thus, the unknown frequency will be in the range $f_1$ to $f_2$ only when b is greater than $K_1$ times a and simultaneously a is greater than $K_2$ times b. This algorithm can be mechanized in many ways. One way is by using potentiometer 58 connected between output a and ground with its tap positioned to generate a signal proportional to $K_1$ times a and to connect this tap to the subtrahend input of digital difference amplifier 62 whose minuend input is connected to output b. Digital difference amplifier 62 has the property that its output is high as long as the result of subtraction is positive, otherwise the output is low. Thus, the output of amplifier 62 is positive only when output b is greater than $K_1$ times the output a. Similarly, potentiometer 60 connected between output b and ground has a tap positioned to generate a signal representing $K_2$ times output b. This tap is connected to the subtrahend input of the digital difference amplifier 64 whose minuend input is connected to output a. Thus, the output of amplifier 64 is high only when output a is greater than $K_2$ times output b. The outputs of amplifiers 62 and 64 are connected to the inputs of two-input AND-circuit 68 which transmits a high signal on line SP only when both its inputs are high. In this way, the passband is tightly defined with substantially infinite flanks. Thus, when a frequency burst within the pass-band is received a signal is transmitted on line SP. If desired, this signal can be detected and fed to a triggered pulse generator such as a one-shot to generate the strobe pulse or may be used directly.

There has thus been shown an improved frequency monitor which by digitizing trigonometric values obtained by interferometric techniques can measure the frequency of microwave signals to a high degree of accuracy.

Although a specific digital mechanization of the system has been shown, other mechanization using the principles of the invention could equally well be used without departing from the spirit of the invention as defined by the appended claims.

What is claimed is:
1. Apparatus for digitally indicating the frequency of an unknown signal comprising:
   an input terminal for receiving the unknown signal;

first signal delay means of predetermined electrical length;
   first correlator means having first and second inputs and first and second outputs for generating signals at said first and second outputs representing respectively $\sin \theta_1$ and $\cos \theta_1$, where $\theta_1$ is the difference in the phase of signals received at said first and second inputs, respectively, said first input being connected directly to said input terminal and said second input being connected via said first signal delay line to said input terminal whereby the differential phase between the signals received at said first and second inputs is a function of the electrical length of said first signal delay line and the frequency of said unknown signal;
   first digitizing means connected to said first and second outputs for generating two binary signals in accordance with the arithmetic signs of $\sin \theta_1$ and $\cos \theta_1$;
   second signal delay means having an electrical length four times the electrical length of said first signal delay means;
   second correlator means having first and second inputs and first and second outputs for generating signals at said first and second outputs representing respectively $\cos \theta_2$ and $\sin \theta_2$, where $\theta_2$ is the difference in phase of signals received at said first and second inputs, respectively, said first input being connected directly to said input terminal and said second input being connected via said second signal delay line to said input terminal whereby the differential phase between the signals received at said first and second inputs is a function of the electrical length of said second delay line and the frequency of said unknown signal;

and second digitizing means connected to the first and second outputs of said second correlator means for generating binary signals in accordance with the arithmetic sign of sin $\theta_2$ and cos $\theta_2$.

2. The apparatus of claim 1 further comprising means for generating a third binary signal having a value determined by the equality of the arithmetic signs of the values (sin $\theta_1$+cos $\theta_1$) and sin ($\theta_1$−cos $\theta_1$).

3. The apparatus of claim 2 further comprising means for sensing when the phase angle $\theta_2$ is within a particular range centered around the quadrant boundaries 90° and 270° to generate a first alarm signal and when the phase angle $\theta_2$ is within said particular range centered around the quadrant boundaries 0° and 180° to generate a second alarm signal, first correction means connected to said sensing means and responsive to said first control signal for substituting the binary signal representing the arithmetic sign of cos $\theta_2$ a binary signal having a value determined by the quality of the arithmetic signs of sin $\theta_2$ and sin $\theta_1$, and second correction means connected to sensing means and responsive to said second control signal for substituting for the binary signal representing the arithmetic sign of sin $\theta$ a binary signal having a value determined by the equality of the arithmetic signs of cos $\theta_2$ and sin $\theta_1$.

4. The apparatus of claim 3 wherein said sensing means includes means for generating the first alarm sign when the values (sin $\theta_2$+n cos $\theta_2$) and (sin $\theta_2$−n cos $\theta_2$) have the same arithmetic signs and means for generating the second alarm signal when the values (cos $\theta_2$+n sin $\theta_2$) and (cos $\theta_2$−n sin $\theta_2$) have the same arithmetic signals, n being a number less than one.

5. The apparatus of claim 2 further including means for generating a fourth binary signal comprising means for generating a first intermediate binary signal having a value determined by the equality of the arithmetic signs of the values (sin $\theta_1$+n cos $\theta_1$) and (sin $\theta_1$−n cos $\theta_1$) means for generating a second intermediate binary signal having a value determined by the equality of the arithmetic signs of the values (cos $\theta_1$+n sin $\theta_1$) and (cos $\theta_1$−n sin $\theta_1$), where n has a value less than unity, and means responsive to the value of said third binary signal to select one of said intermediate binary signals as a fourth binary signal.

6. The apparatus of claim 3 further comprising means for sensing when the phase angle $\theta_2$ is within a particular range centered around the quadrant boundaries 90° and 270° to generate a first alarm signal and when the phase angle $\theta_2$ is within said particular range centered around the quadrant boundaries 0° and 180° to generate a second alarm signal, first correction means connected to said sensing means and responsive to said first control signal for substituting for the binary signal representing the arithmetic sign of cos $\theta_2$ a binary signal having a value determined by the equality of the arithmetic signs of sin $\theta_2$ and sin $\theta_1$, and second correction means connected to said sensing means and responsive to said second control signal for substituting for the binary signal representing the arithmetic sign of sin $\theta$ a binary signal having a value determined by the equality of the arithmetic signs of cos $\theta_2$ and sin $\theta_1$.

7. The apparatus of claim 6 wherein said sensing means includes means for generating the first alarm sign when the values (sin $\theta_2$+n cos $\theta_2$) and (sin $\theta_2$−n cos $\theta_2$) have the same arithmetic signs and means for generating the second alarm signal when the values (cos $\theta_2$+n sin $\theta_2$) and and (cos $\theta_2$−n sin $\theta_2$) have the same arithmetic signals, n being a number less than one.

8. The apparatus of claim 1 further comprising means for sensing when the phase angle $\theta_2$ is within a particular range centered around the quadrant boundaries 90° and 270° to generate a first alarm signal and when the phase angle $\theta_2$ is within said particular range centered around the quadrant boundaries 0° and 180° to generate a second alarm signal, first correction means connected to said sensing means and responsive to said first control signal for substituting for the binary signal representing the arithmetic sign of cos $\theta_2$ a binary signal having a value determined by the quality of the arithmetic signs of sin $\theta_2$ and sin $\theta_1$, and second correction means connected to said sensing means and responsive to said second control signal for substituting for the binary signal representing the arithmetic sign of sin $\theta$ a binary signal having a value determined by the equality of the arithmetic signs of cos $\theta_2$ and sin $\theta_1$.

9. The apparatus of claim 8 wherein said sensing means includes means for generating the first alarm signal when the values (sin $\theta_2$+n cos $\theta_2$) and (sin $\theta_2$−n cos $\theta_2$) have the same arithmetic signs and means for generating the second alarm signal when the values (cos $\theta_2$+n sin $\theta_2$) and (cos $\theta_2$−n sin $\theta_2$) have the same arithmetic signals, *n* being a number less than one.

10. The apparatus of claim 9 further comprising register means for storing said binary signals and means connected to said input terminal for generating a sampling pulse when the received unknown signal is within a predetermined frequency range to permit said register means to accept said binary signals.

* * * * *